United States Patent Office 3,154,582
Patented Oct. 27, 1964

3,154,582
AMINOINDANE DERIVATIVES AND THEIR
PREPARATION
Leslie G. Humber, Montreal, Quebec, Canada, assignor to American Home Products Corporation, New York, N.Y., a corporation of Delaware
No Drawing. Filed July 30, 1963, Ser. No. 298,590
3 Claims. (Cl. 260—570.5)

This invention relates to novel chemical compounds, certain new derivatives of 1-aminoindane and to the process utilized in their preparation.

More particularly, my invention relates to certain bis-1-indanylaminomethyl derivatives of cyclohexane, which new chemical compounds possess valuable pharmacological properties.

The new chemical compounds, in base form, may be generically represented by the Formula I shown below:

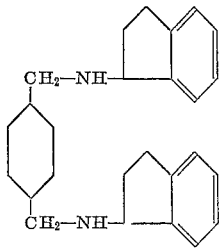

It is generally understood that compounds of the type shown above are capable of existing in two geometrically isomeric forms, commonly called cis and trans depending on the orientation of the two side chains which are attached to the central nucleus. Additionally, the ring carbon atoms to which the nitrogens are attached are asymmetrically substituted and thus obviously, are capable of existing in two configurations, commonly called $d$ and $l$ enantiomers. It is understood that the geometrical isomers and the enantiomers referred to are intended to be within the scope of my invention.

The novel chemical compounds possessing interesting biological activities are basic in nature and form tertiary acid addition salts. Such salts with pharmacologically acceptable acids are biologically equivalent to the free base and constitute a preferred form for the administration of the compounds of my invention.

The new chemical compounds forming the subject of this invention are useful as agents for lowering serum cholesterol levels.

My preferred procedure for preparing the new chemical compounds of this invention may be described schematically as follows:

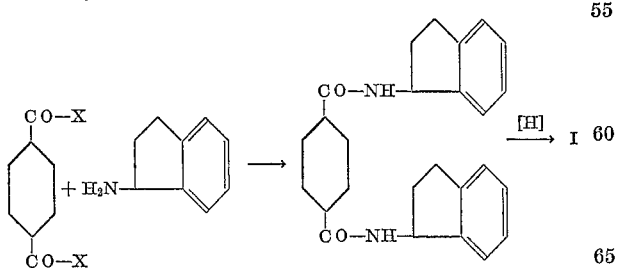

wherein
X is halogen
and
[H] is a reducing agent such as, for example, lithium aluminum hydride.

My invention may be illustrated by the following examples, which should be regarded as illustrative of this invention, rather than as limiting the same.

EXAMPLE 1

*N,N'-Di-(d,l-l-Indanyl)Cyclohexane-1,4-Biscarboxamide*

Cyclohexane-1,4-dicarbonyl chloride (21.1 gm.) (prepared from the diacid with thionyl chloride) and d,l-1-aminoindane (53.28 gm.) were combined in benzene solution and refluxed for 4 hours. The white solid which formed in the reaction mixture was isolated by filtration, washed thoroughly with water and crystallized from ethanol to yield the title compound, M.P. in excess of 310° C. The empirical formula $C_{26}H_{30}N_2O_2$ was confirmed by analysis.

EXAMPLE 2

*1,4-Bis-(d,l-1-Indanylaminomethyl)-Cyclohexane*

The diamide of Example 1 (36.2 gm.) and lithium aluminum hydride (26.4 gm.) were combined in anhydrous tetrahydrofuran (500 ml.) and refluxed for 20 hours. Water (111.2 ml.) was added cautiously, the mixture filtered and the filtrate dried ($Na_2SO_4$) and evaporated to yield the title compound, M.P. 55–57° C. The dihydrochloride salt was prepared by standard procedures. It was crystallized from water and had a melting point in excess of 310° C. Analysis confirmed the empirical formula $C_{26}H_{36}N_2Cl_2$.

I claim:

1. A compound selected from the group which consists of bases of the structural Formula I:

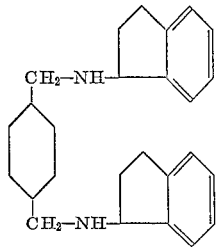

and salts thereof with pharmacologically acceptable acids.

2. A compound of the Formula I

3. The hydrochloric acid salt of 1,4-bis-(d,l-1-indanylaminomethyl)-cyclohexane.

No references cited.